Jan. 22, 1929.   1,699,619
W. MUENCH
PROTRACTOR
Filed April 9, 1925   3 Sheets-Sheet 1
Fig. 1
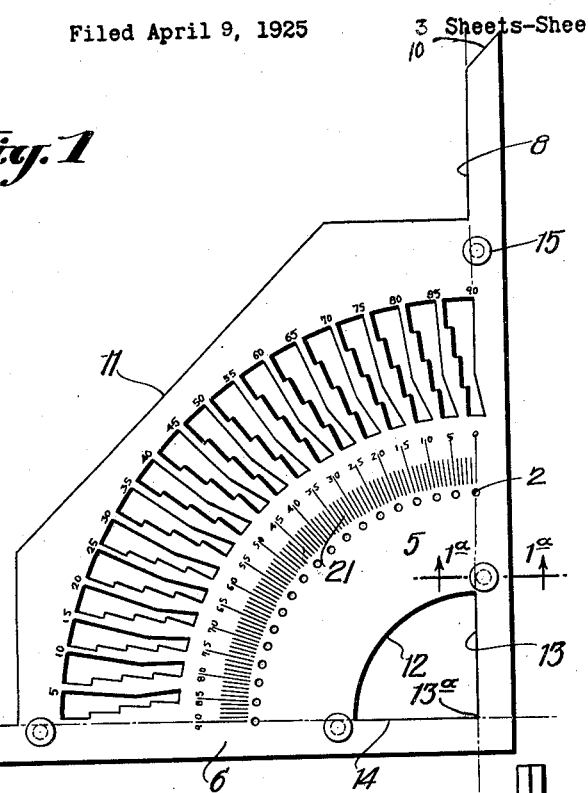
Fig. 1ª
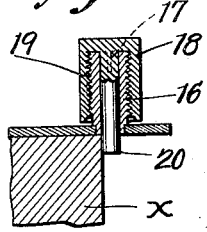
Fig. 2ª   Fig. 2.
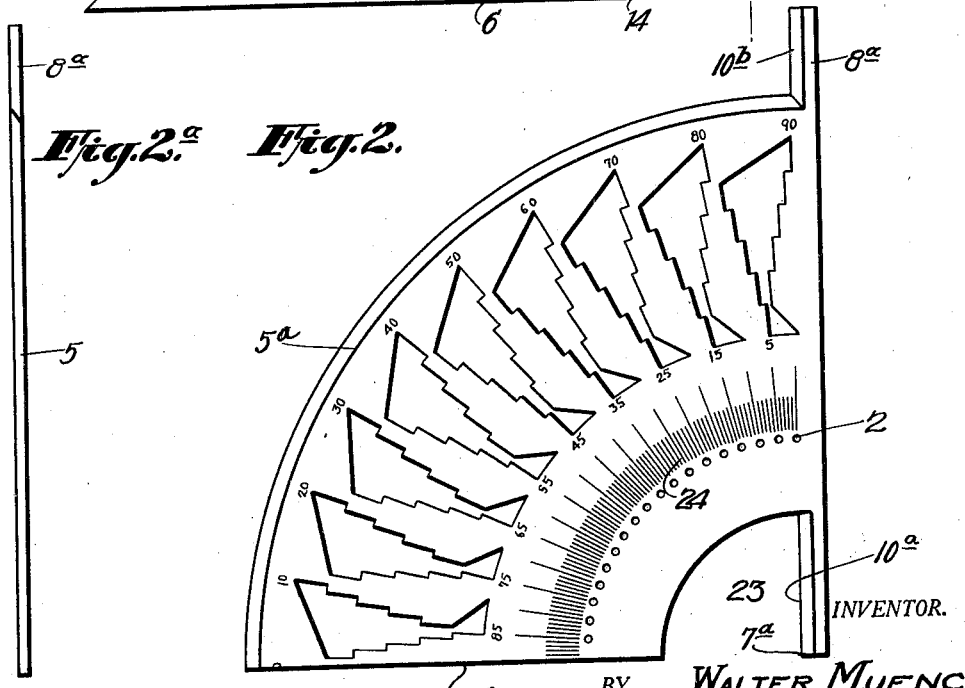
INVENTOR.
WALTER MUENCH.
BY Richard S. Owen
ATTORNEY.

Jan. 22, 1929.

W. MUENCH

PROTRACTOR

Filed April 9, 1925    3 Sheets-Sheet 2

1,699,619

INVENTOR.
WALTER MUENCH.
BY Richard B. Owen
ATTORNEY.

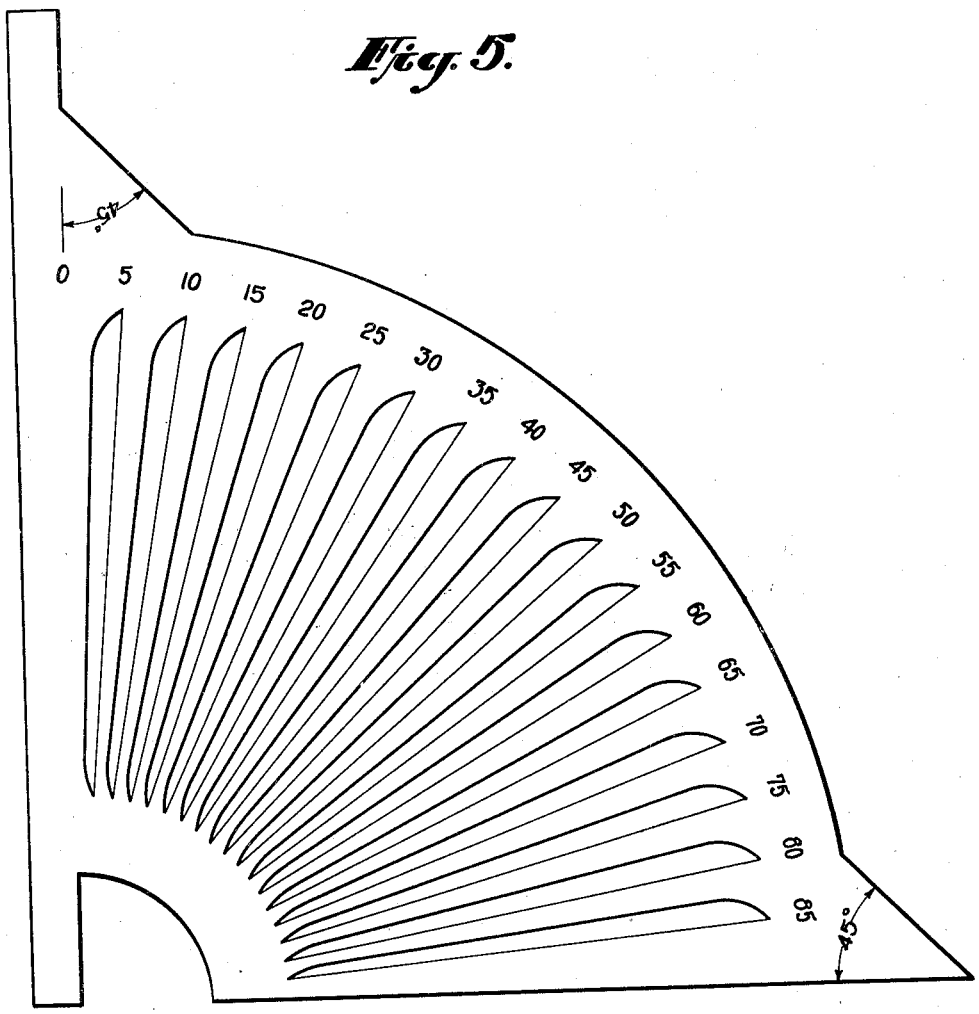

Patented Jan. 22, 1929.

1,699,619

UNITED STATES PATENT OFFICE

WALTER MUENCH, OF BROOKLYN, NEW YORK.

PROTRACTOR.

Application filed April 9, 1925. Serial No. 21,892.

This invention relates to protractors and more particularly to what I term a direct reading protractor in which any angle between zero and ninety degrees may be determined.

One of the objects of my invention is to provide a protractor in the form of a right angle triangle embodying a ninety degree sector in which the body of the said instrument is stamped out in units of five or ten degrees or other convenient multiples of ninety degrees when considered in relation with a graduated ninety degree circular scale of the protractor.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a view of the triangle protractor constructed in accordance with my invention.

Figure 1$^a$ is a sectional view through the squaring plug shown in Figure 1.

Figure 2 is a modified form of the invention showing a protractor stamped out in units of ten degrees.

Figure 2$^a$ is an end view of Figure 2.

Figure 5 is a still further modified form of protractor, similar to that shown by Figure 4.

Figure 3:
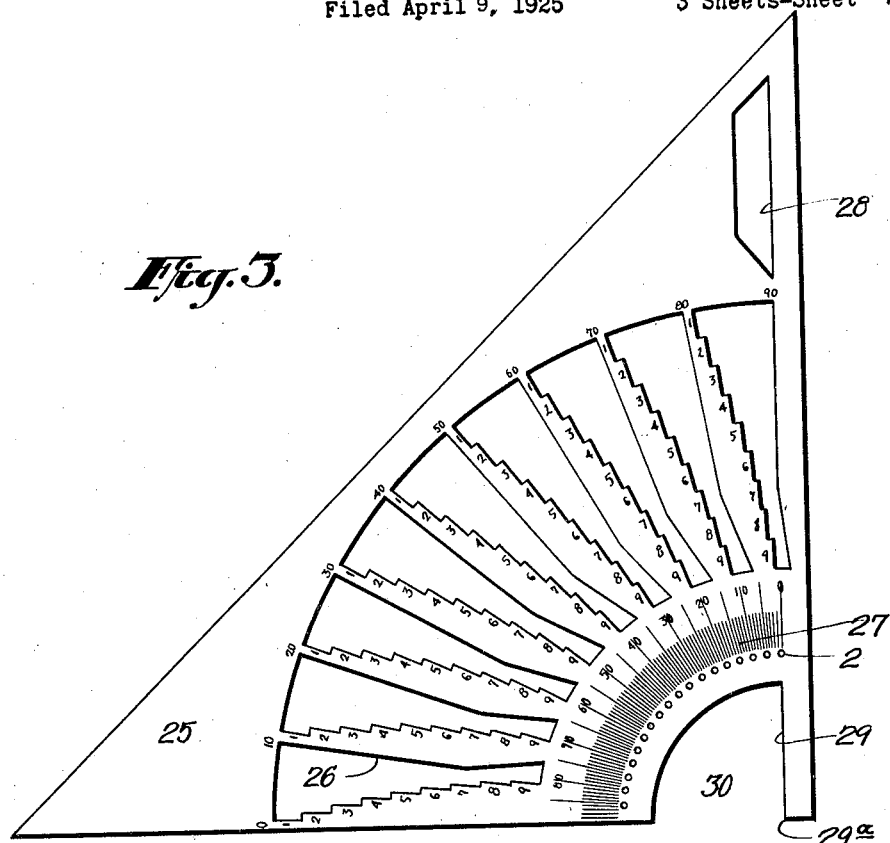
Figure 3 is a modified form of triangle protractor, similar to that shown by Figure 1.

Referring now to the drawings, wherein like reference characters designate coresponding parts throughout the several views, 5 designates in its entirety, the right angle tri angle protractor and sector protractor, which as shown in Figure 1, is provided with the edges 7, 8, said edges being extension lines to the edges 13, 14, respectively. The extreme ends 9, 10, are cut at an angle to align with the 45 degree side 11, which of course, is the hypotenuse of the triangle above referred to.

The main body of the instrument is stamped out as indicated by numeral 12, the vertical edge 13 and the base edge 14 being in alignment with the respective edges 8, 7, above referred to. The point 13$^a$ is the vertex from which the degree lines of the protractor extend. In this type of combined triangle and protractor, there are four squaring plugs 15, a sectional view of one of said plugs being shown by Figure 1$^a$. Each plug consists of an externally threaded bushing 16, permanently secured to the protractor body, preferably by welding. The bushing is split as indicated at 17 to a distance of one-third its length. A cap 18, internally threaded as at 19, fits over the bushing 16, said cap being provided with a cylindrical, solid, central shank 20, which can be adjusted upwardly or downwardly by the action of the screw thread. By reason of the split portion 17, the upper end of the bushing will have a slight tension on the inside thread of the cap, thereby keeping the shank 20 in its lowered or raised fixed position as desired. The position of the bushing 16 is, of course, such that the edges 7, 14, and the edges 8, 13, are tangential to the shank 20.

The protractor shown in Figure 1 is especially designed for use by toolmakers, machinists, instrument makers, carpenters and various other trade mechanics. In the case of a toolmaker, for instance, a certain piece of work requiring the laying out for drilling, milling or perhaps filing to an angle from a given point, let it be assumed that in Figure 1$^a$, $x$ designates the steel block and that on the lower right hand edge is the point from which certain degree lines would have to be plotted on top of the steel block $x$. In order to set the protractor for this operation, it would simply be necessary to screw the cap 18 down on the bushing 16 so that the shank 20 will protrude underneath the protractor disc for the length of approximately one-quarter of an inch. The top and bottom shank 20 of the squaring plug must both rest against the side of the steel block and so it is quite evident that by the use of the protractor as above set forth, the vertex can be brought into perfect alignment with any point on the right hand edge of the steel block x. The bushed shanks, being positioned on the edges 7, 14, see Figure 1, can then be brought into contact with the front edge of the steel block x or on either edge thereof depending of course, entirely on the nature of the work to be plotted or from the point from which the work is being measured. In the same manner, the protractor may be used on any side of the steel block and entirely about this piece of work. Were it necessary to plot the degree lines on the top surface of the steel block x from a point, say, exactly in the center from all four sides and it is desired to use the same protractor, it is quite obvious that the shanks 20 extending beneath the surface of the protractor must now be withdrawn, which necessitates threading the cap 18 upward instead of downward on the bushing 16 until each shank 20 is flush with the bottom surface of the said protractor. It therefore, is not necessary to entirely withdraw the shank 20 from the bushing 16. When the shanks are thus adjusted the protractor can then be shifted so that the vertex 13$^a$ may be set at the central point of the steel block as mentioned above to plot the desired degree lines. It will thus be seen that the squaring plugs on the protractor are, under certain conditions, very important for plotting degrees accurately on surfaces of the work. The instrument is provided with four squaring plugs, each having a bushing which is permanently fastened for reasons of accuracy. There are two plugs on each side and while the instrument can be used on the front side only, yet can be swung so that it will fit at right angles into any position, which is relative to a vertical or horizontal line.

The main body of the protractor is stamped out into units, each of said units being a multiple of five degrees. This is what might be termed a five degree scale so that there are eighteen units between zero and ninety degrees. Each unit consists of a staggered edge and when considered in connection with the scale 21, provides four consecutive degrees that may be quickly found or determined at any point on the scale. The opposite or longer side of each unit, represents an angle which is a multiple of five degrees. In this manner it will be seen that when accomplishing work involving unusual measurements where it is desired to quickly ascertain and draw a line without computations, the particular degree of angle may be determined either from the zero or ninety degree point on the scale 21 which coincides with the staggered lines of each unit above referred to, or the individual may work from the units and check back to the scale.

Referring now to Figure 2 of the drawings, the instrument is in the form of a sector protractor, wherein the triangle feature is eliminated. The main body of the instrument is stamped out as indicated at 23. The edge 10$^a$ is in alignment with the edge 10$^b$ on the extension 8$^a$. The edges 10$^a$ and 10$^b$ are bevelled merely to produce a very fine edge for drawing lines in laying out problems or to align this fine edge to certain fixed points when reading off degrees on drawings, and so forth. On account of the bevelled edge 10$^a$ and 10$^b$, this protractor can be used on the front side only. The bevelled edge 5$^a$ of the protractor disc is simply to conform to the appearance of the instrument. The point 7$^a$ is the vertex of the sector. The edge 35 must be regarded as the base of the instrument.

Figure 4:
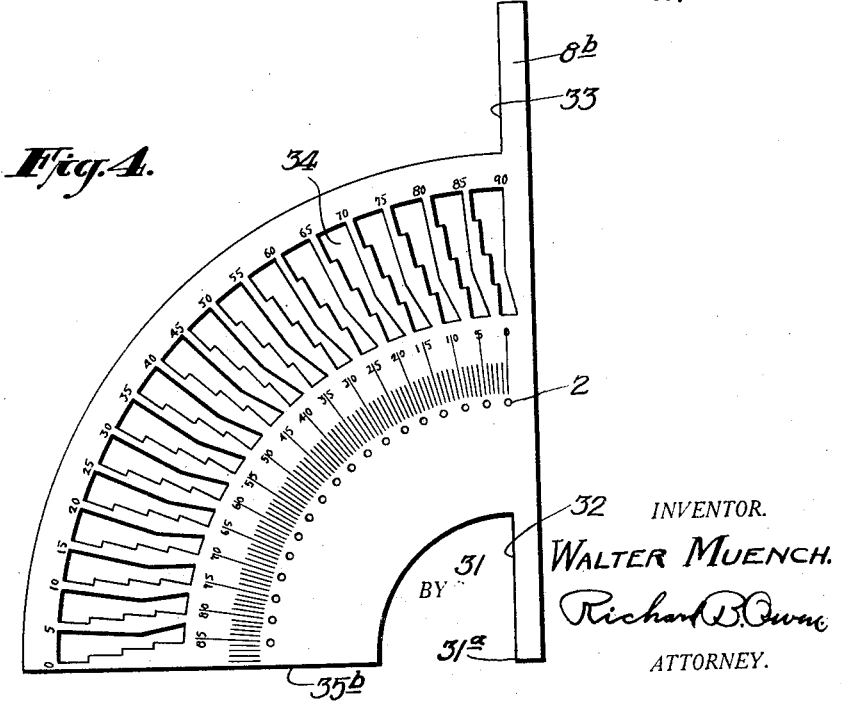
Figure 4 is a modified form of protractor similar to that shown by Figure 2.

In this form of the invention, a ninety degree scale, as indicated at 24, is shown similar to that shown in connection with Figure 1. In this type of instrument, I also provide a series of units blocked out in multiples of ten degrees so that nine of such units of ten degrees each, are present. The sides of each unit consist of a staggered edge broken by five consecutive lines of one degree difference. In other words, any degree between one and five may be quickly determined along one side of each unit. The opposite edge of each unit is similarly cut so as to provide a staggered edge consisting of five connected lines, for instance, each of which differs by one degree. Considering each unit it will thus be seen that it consists of a ten degree scale which coincides with the graduated scale 24. In the same manner, it will be readily observed that any degree between zero and ninety degrees may be quickly determined by referring to the scale 24 to one of the units or by a simple addition or substraction, the desired degree may be quickly found by working in the unit numbered and the accuracy may be checked up by referring back to the scale 24. This bevelled protractor requires to be made individually in sets of two, one for left hand use and one for right hand use. In Figure 3 of the drawings, the triangle protractor 25 is provided with nine units or stamped out portions of ten degrees each. In this form of the invention, however, it will be observed that the units are considerably longer than the unit shown, in connection with Figure 2 and that the staggered edge is constructed along a nine degree scale, along the principle of the staggered edge referred to in connection with the description of Figure 1. The longer edge 26 opposite the staggered edge represents a degree which is a multiple of ten. Here also, the graduated scale 27 permits the individual to check up on the work. The stamped out portion 28 permits of the drawing of a continuation line from the edge 29, the latter being formed by the cut out space 30. The point 29$^a$ is the vertex of the sector protractor as well as of the triangle. Figure 4 is a further modified type of sector protractor somewhat similar to Figure 2. This form of the invention shows the cut out space 31 is provided, as in the other forms, to produce the edge 32 which correspondingly is in alignment with the edge 33 of the extension $8^b$. The main body of the protractor is stamped out in units of five degrees as indicated at 34 and similar to the units as described in connection with Figure 1. However, the base $35^b$ of the protractor, as in Figures 2 and 3, constitutes the zero point reading in one direction and the ninety degree point when reading in the opposite direction. The graduated scale, of course, is also provided for the obvious purpose and the reasons heretofore given. The point $31^a$ is the vertex of the sector protractor.

Reference may now be had to Figure 5 in which I have departed somewhat from the general staggered structure of degree edges, which permitted an unlimited use in both laying out or reading off of every single degree line. In Figure 5, in which both the triangle and protractor feature is again defined as in Figure 1, and Figure 3, there is shown a modified form of protractor in so far as only every fifth and tenth degree line is produced as an edge in the protractor disc by the stamping out of the body of the instrument. The long drawn edges numbered at the top closely resemble the long unit edges in Figure 3. The use of this protractor, is of course, limited in consequence of the spaces between the edges of every second to fourth and sixth to ninth degree.

For the purpose of laying off degree lines which are fractions of one degree, the protractor as shown in Figures 1, 2, 3 and 4 are provided with locating holes 2, in which the pins of a vernier attachment fit, said attachment reading in units of one minute.

In the various protractors, each unit of five or ten degrees is numbered so that it is only necessary to count off on the staggered edges, the degree desired without having to consult the graduated scale. For that reason the sector scale can be left off on all protractors, as in Figure 5, for instance. It is merely in conformity with the custom that protractors, as shown in Figures 1 to 4 inclusive, be provided with degree graduations. For a summary remark, it is indicated that wherever the mechanical limits and features permitted it, in the different designs of my novel protractor, the numeration of the staggered degree edges and the sectorial graduation is provided on both the front and the back of the instrument. As this is the case in the designs shown in Figures 3, 4 and 5, if the instrument shown in Figures 3 and 4, for instance, were turned over from left to right, considering the vertical edge as if stationary, as in the leaves of a book, taking the position of the protractor in Figure 5 and so making it possible to draw degree lines or to read them off. It is evident that the protractors shown in Figures 3, 4 and 5 can be fitted into any sector of an assumed circle by shifting or turning.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

The protractors shown in Figures 2 to 5 inclusive are best suited for use by draftsmen, mechanical, electrical and civil engineers and by architects and contractors.

Having thus described my invention, what I claim as new and desire to secure by United States Letters Patent is:—

1. A combined triangle and protractor comprising an instrument having a plurality of contiguous units cut out of the body thereof along the arc of a circle, and having a ninety degree scale marked thereon and corresponding with said units, certain of the edges of each of the units being in radial alignment with predetermined degree marks on the scale, there being a cutout in one corner of said protractor, the edges of which are in alignment with the end marks of said scale respectively.

2. A protractor comprising an instrument having a plurality of contiguous units cut out of the body thereof and having a ninety degree scale marked thereon to correspond with said units, the outer adjacent edges of each of said units constituting a difference of one degree in the scale and said units having points in alignment with the said ninety degree scale and the opposite edge of each of said units being radially cut to a predetermined degree.

3. A combination triangle and protractor comprising an instrument having a plurality of contiguous units cut out of the body thereof, and having a ninety degree scale marked thereon, the edges of each of said units being in alignment with predetermined angles as indicated by the said ninety degree scale, and squaring plugs located along two sides of said instrument in alignment with the ends of said scale.

4. In a protractor, a sheet of material having a scale of angles thereon, there being portions cut out of said sheet at least one edge of each portion being of step-like formation whose radial risers align with predetermined angles as indicated by said scale.

5. A combined triangle and protractor comprising a sheet of material having a scale of angles thereon, there being portions cut out of said sheet at least one edge of each portion being of step-like formation whose radial risers align with predetermined angles as indicated by said scale and a plurality of plugs arranged along the edge of said instrument, arranged to define a line passing through a predetermined unit on said scale.

6. A combination triangle and protractor comprising a sheet of metal having a scale of angles thereon, there being portions cut out of said sheet, at least one edge of each portion being of step-like formation, the radial risers of which align with predetermined angles as indicated by said scale, and the opposite edges of each portion being arranged to align with other predetermined angles of the scale.

In testimony whereof I affix my signature.

WALTER MUENCH. [L. S.]